United States Patent
Chang et al.

(10) Patent No.: US 8,224,559 B2
(45) Date of Patent: Jul. 17, 2012

(54) METHOD AND APPARATUS TO MONITOR A MASS AIRFLOW METERING DEVICE IN AN INTERNAL COMBUSTION ENGINE

(75) Inventors: Chen-Fang Chang, Troy, MI (US); Jun-Mo Kang, Ann Arbor, MI (US); Man-Feng Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 372 days.

(21) Appl. No.: 12/691,056

(22) Filed: Jan. 21, 2010

(65) Prior Publication Data

US 2011/0178693 A1 Jul. 21, 2011

(51) Int. Cl.
*F02M 51/00* (2006.01)
*G06G 7/70* (2006.01)
(52) U.S. Cl. ........................ 701/114; 123/479
(58) Field of Classification Search .................. 701/114, 701/29, 103; 123/479, 339.15; 73/114.31, 73/114.32, 114.02
See application file for complete search history.

(56) References Cited

U.S. PATENT DOCUMENTS

| 5,698,780 A * | 12/1997 | Mizutani et al. ........... 73/114.33 |
| 6,370,935 B1 * | 4/2002 | He et al. ....................... 73/1.34 |
| 2003/0230287 A1 * | 12/2003 | Ozeki et al. .................. 123/479 |
| 2009/0187301 A1 * | 7/2009 | Wang et al. ..................... 701/29 |

FOREIGN PATENT DOCUMENTS

| JP | 02267342 A | * 11/1990 |
| JP | 2000161124 A | * 6/2000 |

* cited by examiner

*Primary Examiner* — Mahomoud Gimie

(57) ABSTRACT

A method for operating an internal combustion engine configured to operate in a controlled auto-ignition combustion mode and equipped with a mass airflow metering device includes monitoring an engine combustion state, monitoring states of engine operating parameters, calculating a nominal intake air mass flowrate corresponding to the states of the engine operating parameters, estimating an intake air mass flowrate corresponding to the nominal intake air mass flowrate and the engine combustion state, measuring intake air mass flowrate with the mass airflow metering device, comparing the estimated and measured intake air mass flowrates, and detecting a fault related to the mass airflow metering device when a difference between the estimated and measured intake air mass flowrates exceeds a predetermined threshold.

11 Claims, 3 Drawing Sheets

METHOD AND APPARATUS TO MONITOR A MASS AIRFLOW METERING DEVICE IN AN INTERNAL COMBUSTION ENGINE

TECHNICAL FIELD

This disclosure relates to monitoring operation of mass airflow metering devices in internal combustion engines.

BACKGROUND

The statements in this section merely provide background information related to the present disclosure and may not constitute prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous SI combustion mode and a stratified-charge SI combustion mode. SI engines can be configured to operate in a homogeneous-charge compression-ignition (HCCI) combustion mode, also referred to interchangeably as controlled auto-ignition (HCCI) combustion, under predetermined speed/load operating conditions. The controlled auto-ignition (HCCI) combustion includes a distributed, flameless, auto-ignition combustion process that is controlled by oxidation chemistry. An engine operating in the controlled auto-ignition (HCCI) combustion mode has a cylinder charge that is preferably homogeneous in composition, temperature, and residual exhaust gases at intake valve closing time. Controlled auto-ignition (HCCI) combustion is a distributed kinetically-controlled combustion process with the engine operating at a dilute air/fuel mixture, i.e., lean of an air/fuel stoichiometric point, with relatively low peak combustion temperatures, resulting in low nitrous oxides (NOx) emissions. The homogeneous air/fuel mixture minimizes occurrences of rich zones that form smoke and particulate emissions.

Controlled auto-ignition (HCCI) combustion depends strongly on factors such as cylinder charge composition, temperature, and pressure at intake valve closing. Hence, the control inputs to the engine must be carefully coordinated to ensure auto-ignition combustion. Controlled auto-ignition (HCCI) combustion strategies may include using an exhaust recompression valve strategy. The exhaust recompression valve strategy includes controlling a cylinder charge temperature by trapping hot residual gas from a previous engine cycle by adjusting valve close timing. In the exhaust recompression strategy, the exhaust valve closes before top-dead-center (TDC) and the intake valve opens after TDC creating a negative valve overlap (NVO) period in which both the exhaust and intake valves are closed, thereby trapping the exhaust gas. The opening timings of the intake and exhaust valves are preferably symmetrical relative to TDC intake. Both a cylinder charge composition and temperature are strongly affected by the exhaust valve closing timing. In particular, more hot residual gas from a previous cycle can be retained with earlier closing of the exhaust valve leaving less room for incoming fresh air mass, thereby increasing cylinder charge temperature and decreasing cylinder oxygen concentration. In the exhaust recompression strategy, the exhaust valve closing timing and the intake valve opening timing are measured by the NVO period.

In engine operation, the engine airflow is controlled by selectively adjusting position of the throttle valve and adjusting opening and closing of intake valves and exhaust valves. On engine systems so equipped, opening and closing of the intake valves and exhaust valves are accomplished using a variable valve actuation system that includes variable cam phasing and a selectable multi-step valve lift, e.g., multiple-step cam lobes which provide two or more valve lift positions. In contrast to the throttle position change, the change in valve position of the multi-step valve lift mechanism is a discrete change, and not continuous.

When an engine operates in a controlled auto-ignition (HCCI) combustion mode, the engine control includes lean or stoichiometric air/fuel ratio operation with the throttle wide open to minimize engine pumping losses. When the engine operates in the SI combustion mode, the engine control includes stoichiometric air/fuel ratio operation, with the throttle valve controlled over a range of positions from 0% to 100% of the wide-open position to control intake airflow to achieve the stoichiometric air/fuel ratio.

When an engine operates in a controlled auto-ignition (HCCI) combustion mode including recycling of exhaust gas using a variable valve actuation system, the auto-ignited combustion depends on the temperature, composition, and pressure of the cylinder charge, including a large portion of the cylinder charge being residual gas at intake valve closing. For example, with the exhaust recompression strategy, the cylinder charge temperature is controlled by trapping the hot residual gas from the previous engine cycle by closing the exhaust valve early during the exhaust stroke, while opening the intake valve at a late timing symmetrical to the exhaust valve closing timing. The cylinder charge composition and temperature depend on how early the exhaust valve closes during the exhaust stroke. When the exhaust valve closes earlier during the exhaust stroke, a greater amount of the hot residual gas from previous engine cycle is trapped in the cylinder, thereby increasing the cylinder charge temperature.

The amount of the residual gas trapped in the combustion chamber during operation in the spark ignition SI combustion mode is relatively small, and therefore the effect of the residual gas temperature on the amount of the fresh air charge is insignificant. When an engine operates in a controlled auto-ignition (HCCI) combustion mode, the cylinder charge contains a significant amount of hot residual gas, which can substantially affect the amount of incoming fresh air charge. This is because when the large amount of hot residual gas is compressed during recompression, a significant amount of heat is transferred to the cylinder wall as the piston moves toward top-dead-center. Thus, when the intake valve opens at a late timing symmetrical to the exhaust valve closing timing, the pressure of the residual gas is significantly lower than when the exhaust valve closes, creating a vacuum in the cylinder, promoting added fresh air entering the cylinder. However, when there is incomplete combustion or no combustion in one or more cylinders, e.g., as a result of a misfire, partial-burn or fuel cutoff event (e.g., during a deceleration event), the temperature of the residual gas can be significantly lower. In such engine operation, the amount of heat transfer is minimal and the vacuum created in the cylinder when the intake valve opens is less. Thus, the engine mass airflow decreases when there is incomplete combustion or no combustion in one or more of the cylinders.

Known powertrain control architectures include mass airflow metering devices for monitoring intake airflow to the engine. One embodiment of a mass airflow metering device uses anemometry to determine the intake air mass flowrate. Known anemometric measurement systems include placing a sensing device having electrical resistive properties correlative to mass airflow in the intake air flowstream. The sensing device can be incorporated into a known electrical circuit that includes measurement and signal conditioning to measure electrical current flow thereacross. There is a correlation between the electrical current flow across the sensing device and the mass airflow past the sensing device that can be measured and calibrated using the electrical circuit. The electrical circuit communicates the mass airflow to a control module. Embodiments of anemometric sensing systems can include different sensing devices, e.g., hot-wire and hot-film, and different electrical circuits.

Known powertrain control architectures include systems for monitoring operation of the mass airflow metering device to ensure proper engine control and operation, and to identify component and system faults. Monitoring requirements for a mass airflow metering device include monitoring to detect electrical shorts and open circuits. Monitoring requirements for a mass airflow sensor include monitoring to detect in-range flow rationality, wherein a signal output from a mass airflow metering device is monitored for signal bias or unexpected variations. Known in-range faults for a mass airflow metering device can be caused by faults that affect resistance (s) of elements of the electrical circuits, faults that change the resistance of the sensing device, and faults that change aspects of the sensing device that interfere with its capacity to meter incoming air, such as dust buildup on the sensing device and changes related to its orientation in the air flowstream.

SUMMARY

A method for operating an internal combustion engine configured to operate in a controlled auto-ignition combustion mode and equipped with a mass airflow metering device includes monitoring an engine combustion state, monitoring states of engine operating parameters, calculating a nominal intake air mass flowrate corresponding to the states of the engine operating parameters, estimating an intake air mass flowrate corresponding to the nominal intake air mass flowrate and the engine combustion state, measuring intake air mass flowrate with the mass airflow metering device, comparing the estimated and measured intake air mass flowrates, and detecting a fault related to the mass airflow metering device when a difference between the estimated and measured intake air mass flowrates exceeds a predetermined threshold.

BRIEF DESCRIPTION OF THE DRAWINGS

One or more embodiments will now be described, by way of example, with reference to the accompanying drawings, in which.

DETAILED DESCRIPTION

Figure 1:
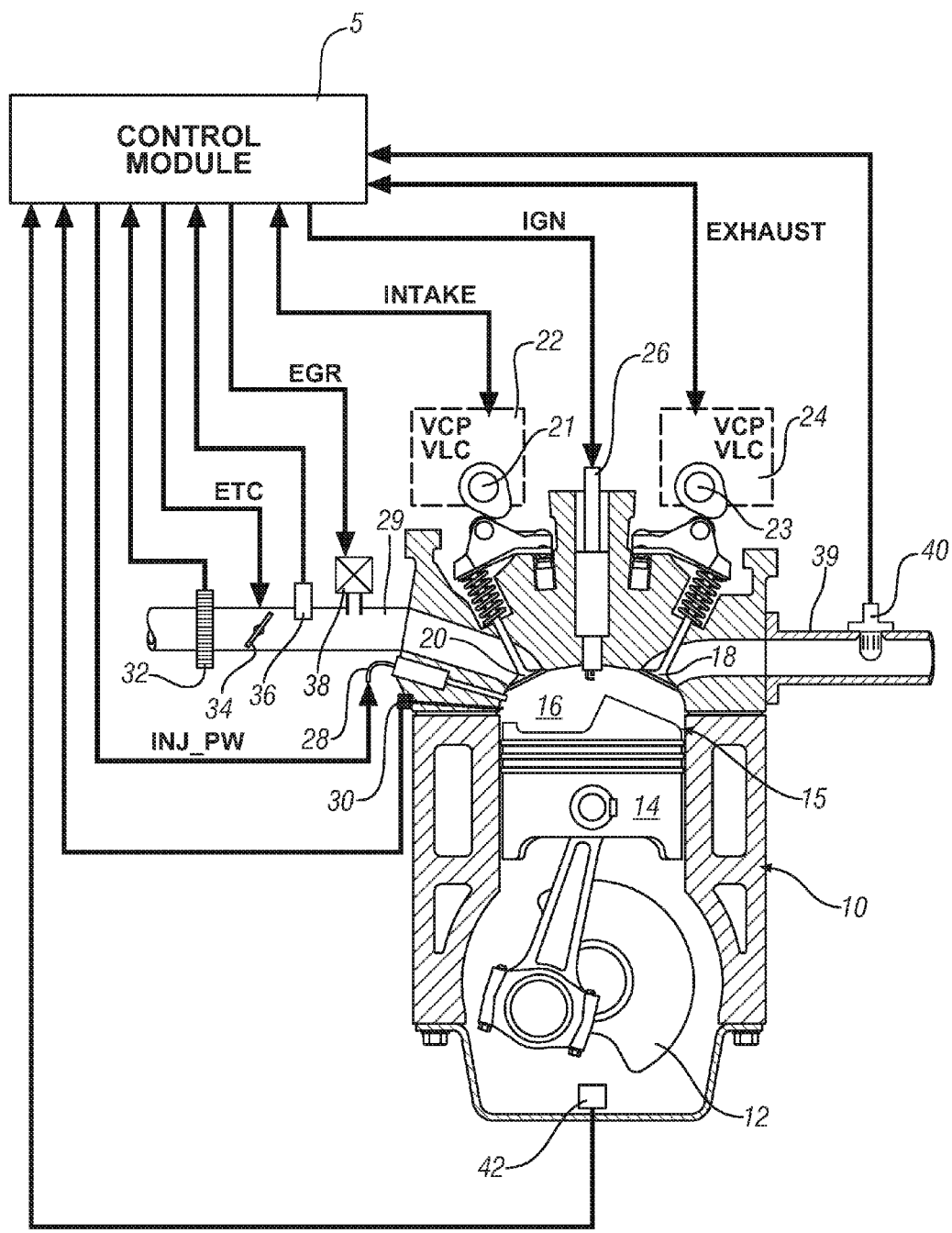
FIG. 1 is a schematic drawing of an exemplary engine system, in accordance with the present disclosure.

Referring now to the drawings, wherein the depictions are for the purpose of illustrating certain exemplary embodiments only and not for the purpose of limiting the same, FIG. 1 schematically shows an internal combustion engine 10 and an accompanying control module 5 that have been constructed in accordance with an embodiment of the disclosure. The engine 10 is selectively operative in a plurality of combustion modes, including a controlled auto-ignition (HCCI) combustion mode, a homogeneous spark-ignition (SI-H) combustion mode, and an intermediate stratified-charge spark-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles.

In one embodiment the engine 10 can be coupled to a transmission device to transmit tractive power to a driveline of a vehicle. The transmission can include a hybrid transmission including torque machines operative to transfer tractive power to a driveline.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the airflow. The air intake devices preferably include a mass airflow metering device including a mass airflow sensor 32 for monitoring engine intake air mass flowrate in one embodiment. The mass airflow sensor 32 is preferably further configured to monitor a corresponding temperature of the intake air. A throttle valve 34 preferably includes an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 and variably adjust and control phasing of the intake camshaft 21 for each cylinder 15 in response to a control signal (INTAKE) from the control module 5. The exhaust VCP/VLC device 24 preferably includes a controllable mechanism operative to variably switch and control valve lift of the exhaust valve(s) 18 and variably adjust and control phasing of the exhaust camshaft 23 for each cylinder 15 in response to a control signal (EXHAUST) from the control module 5.

The intake and exhaust VCP/VLC devices 22 and 24 each preferably includes a controllable two-step variable lift control (VLC) mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operating parameters, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 includes a sensor device operative to monitor a state of a combustion parameter and is depicted as a cylinder pressure sensor operative to monitor in-cylinder combustion pressure. The signal output from the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors. The signal output from the combustion sensor 30 is monitored by the control module 5 to determine presence of incomplete combustion or no combustion, e.g., due to a cylinder misfire event or partial burn of a combustion charge, which is indicated by reduced cylinder combustion pressure.

The control module 5 may take any suitable form including various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of the engine operating parameters. The control module 5 is configured to receive input signals from an operator (e.g., via a throttle pedal and a brake pedal) to determine an operator torque request the control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include NVO and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

During engine operation, the throttle valve 34 is preferably substantially wide-open in the controlled auto-ignition (HCCI) combustion modes, e.g., single and double injection controlled auto-ignition (HCCI) combustion modes, with the engine 10 controlled at a lean air/fuel ratio. Substantially wide-open throttle can include operating fully un-throttled, or slightly throttled to create a vacuum in the intake manifold 29 to effect EGR flow. In one embodiment, in-cylinder EGR mass is controlled to a high dilution rate, e.g., greater than 40% of cylinder air charge. The intake and exhaust valves 20 and 18 are in the low-lift valve position and the intake and exhaust lift timing operate with NVO. One or more fuel injection events can be executed during an engine cycle including at least one injection during a compression phase.

During engine operation in the homogeneous spark-ignition (SI-H) combustion mode, the throttle valve 34 is controlled to regulate the air flow. The engine 10 is controlled to a stoichiometric air/fuel ratio, and the intake and exhaust valves 20 and 18 are in the high-lift valve open position and the intake and exhaust lift timing operate with a positive valve overlap. Preferably, a fuel injection event is executed during compression phase of an engine cycle, preferably substantially before TDC. Spark ignition is preferably discharged at a predetermined time subsequent to the fuel injection when air charge within the cylinder is substantially homogeneous.

The intermediate stratified-charge spark-ignition combustion mode includes operating substantially lean of stoichiometry. Fuel injection timing is preferably close in time to the spark ignition timing to prevent the air/fuel mixture from homogenizing into a uniformly dispersed mixture. The injected fuel mass is injected in the combustion chamber 15 with rich layers around the spark plug and leaner air/fuel ratio areas further out at the time of spark ignition. A fuel pulse width can end as the spark event begins or immediately prior thereto.

Figure 2:
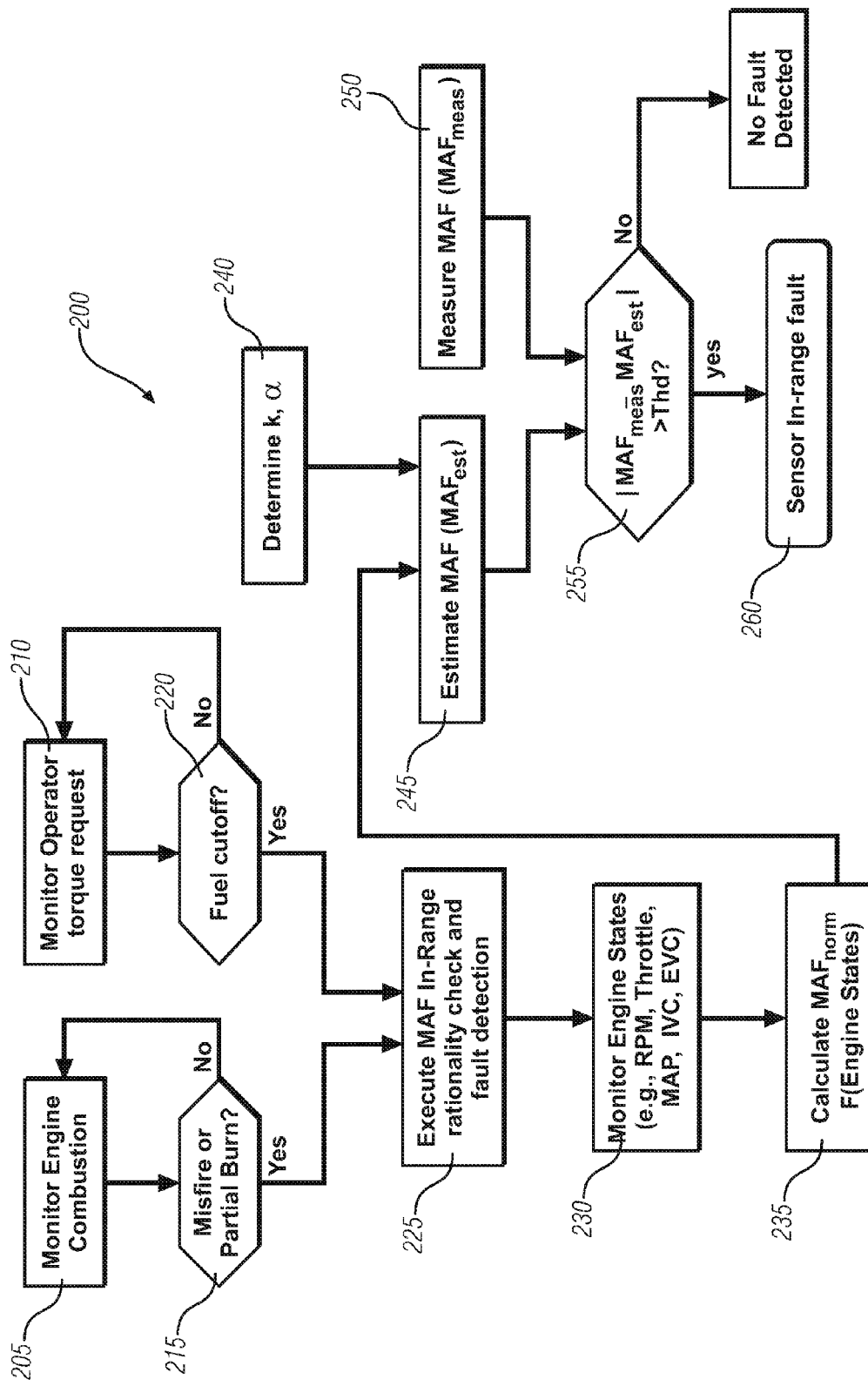
FIG. 2 is an algorithmic flowchart, in accordance with the present disclosure.

FIG. 2 shows an algorithmic flowchart 200 for executing an in-range rationality check of the mass airflow sensor 32, preferably executed during engine operation in the controlled auto-ignition combustion mode. The in-range rationality check of the mass airflow sensor 32 includes monitoring an engine combustion state, monitoring the engine operation and determining states of engine operating parameters related to engine airflow when operating in the controlled auto-ignition mode. A nominal intake air mass flowrate associated with the monitored engine combustion state and the states of the engine operating parameters is calculated. An engine intake air mass flowrate can be estimated corresponding to the nominal intake air mass flowrate and the engine combustion state. Coincidentally, the engine intake air mass flowrate is measured using the mass airflow sensor 32 and compared to the estimated intake air mass flowrate to determine whether there is an in-range fault.

During operation in the controlled auto-ignition (HCCI) combustion mode, engine combustion is monitored (205) and an operator torque request is monitored (210). When results of monitoring the engine combustion state indicates incomplete combustion or no combustion, e.g., due to presence of one or more cylinder misfire events or partial burns (215), or the operator torque request indicates the operator has commanded a closed throttle leading to a fuel cutoff event (220), e.g., by removing their foot from an accelerator pedal, an algorithm is executed to perform an in-range rationality check to detect presence of a fault in the mass airflow sensor 32 (225). Cylinder misfire events and partial burns can be detected by monitoring signal outputs from the combustion sensor 30.

Figure 3:
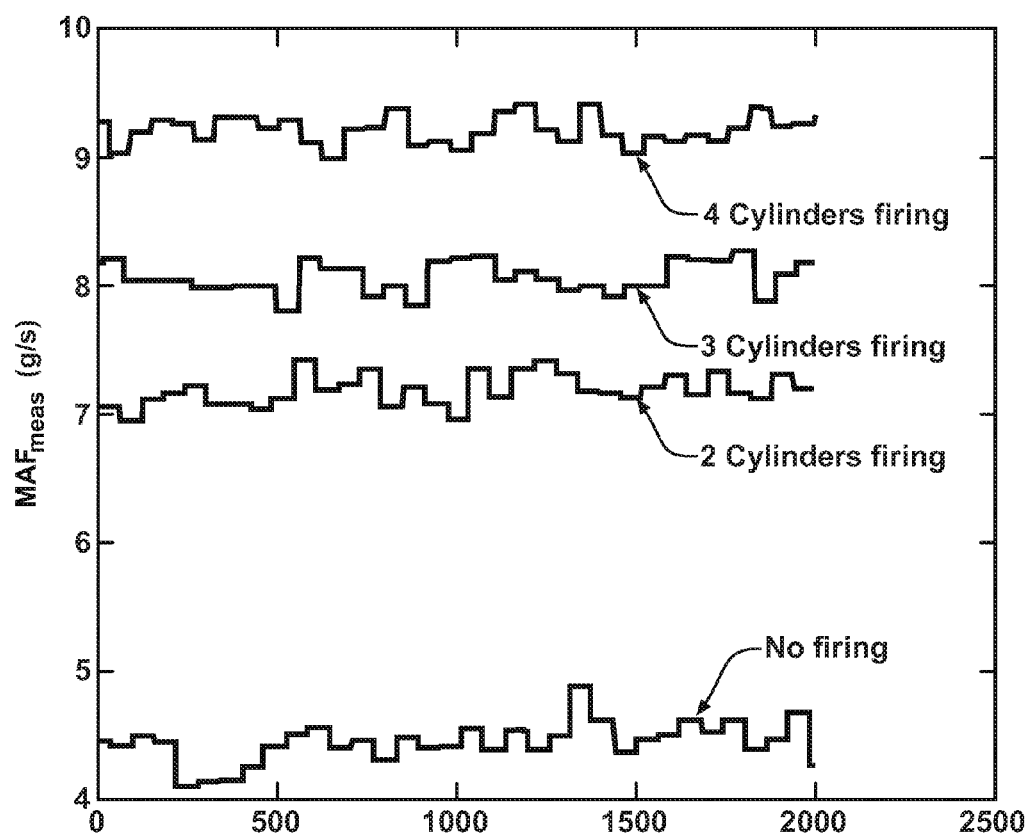
FIG. 3 is a datagraph, in accordance with the present disclosure.

FIG. 3 graphically shows a measured intake air mass flowrate over time for an exemplary four-cylinder engine operating in the controlled auto-ignition mode with four of the four cylinders firing, three of the four cylinders firing, two of the four cylinders firing, and no cylinders firing (fuel cutoff). The effect of incomplete combustion or no combustion, e.g., as related to cylinder misfire and partial/incomplete combustion, is used as described with reference to Eq. 1, below.

The in-range rationality check includes monitoring states of engine operating parameters, including, e.g., engine speed (RPM), position of the throttle 34 (Throttle), manifold pressure (MAP), opening and closing timings of the intake and exhaust valves 20 and 18, magnitude of lift of the intake and exhaust valves 20 and 18, intake air temperature, barometric pressure, and other related engine operating parameters (230). A nominal intake air mass flowrate ($MAF_{norm}$) can be calculated, corresponding to the specific engine parameters and monitored states of the engine operating parameters (235). One skilled in the art is able to use known methods to calculate the nominal intake air mass flowrate based upon an effective cylinder volumetric displacement corresponding to intake valve closing timing (IVC) and exhaust valve closing timing (EVC), engine speed (RPM) and manifold pressure (MAP).

The estimated intake air mass flowrate $MAF_{est}$ corresponds to the nominal intake air mass flowrate and the engine combustion state (245). This includes determining a number of firing cylinders k and a reduction ratio α. The reduction ratio α includes a reduction in airflow due to incomplete combustion or no combustion and is calibratable based upon the engine operating conditions (240). The estimated intake air mass flowrate $MAF_{est}$ is calculated based upon the nominal intake air mass flowrate as follows:

$$MAF_{est} = \frac{k}{n}MAF_{norm} + \frac{n-k}{n}\alpha MAF_{norm}, 0 < \alpha < 1 \quad [1]$$

wherein n is the number of engine cylinders.

Coincidentally, the engine intake air mass flowrate $MAF_{meas}$ is measured using the mass airflow sensor 32 (250). The measured engine intake air mass flowrate $MAF_{meas}$ is compared to the estimated intake air mass flowrate $MAF_{est}$ to determine a difference therebetween, and the difference is compared to a predetermined threshold (Thd) (255). When the difference between the measured engine intake air mass flowrate $MAF_{meas}$ and the estimated intake air mass flowrate $MAF_{est}$ exceeds the predetermined threshold, an in-range fault for the mass airflow sensor 32 is identified (260). Thus, during operation in the controlled auto-ignition combustion mode, in-range faults related to operation of the mass airflow sensor 32 can be detected. The predetermined threshold for a difference between the measured engine intake air mass flowrate $MAF_{meas}$ and the estimated intake air mass flowrate $MAF_{est}$ corresponds to an error in the intake air mass flowrate sufficient to affect the engine air/fuel ratio and engine-out emissions by a predetermined amount.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating an internal combustion engine configured to operate in a controlled auto-ignition combustion mode and equipped with a mass airflow metering device, the method comprising:
   monitoring an engine combustion state;
   monitoring states of engine operating parameters;
   calculating a nominal intake air mass flowrate corresponding to the states of the engine operating parameters;
   estimating an intake air mass flowrate corresponding to the nominal intake air mass flowrate and the engine combustion state;
   measuring intake air mass flowrate with the mass airflow metering device;

comparing the estimated and measured intake air mass flowrates; and detecting a fault related to the mass airflow metering device when a difference between the estimated and measured intake air mass flowrates exceeds a predetermined threshold.

2. The method of claim 1:

wherein monitoring the engine combustion state comprises monitoring individual cylinder combustion states; and wherein estimating the intake air mass flowrate comprises estimating an intake air mass flowrate associated with the nominal intake air mass flowrate and the individual cylinder combustion states.

3. The method of claim 2, further comprising:

detecting incomplete combustion in an individual cylinder; and wherein estimating the intake air mass flowrate further comprises estimating the intake air mass flowrate associated with the incomplete combustion in the individual cylinder.

4. The method of claim 2, further comprising:

detecting incomplete combustion in a plurality of cylinders; and wherein estimating the intake air mass flowrate further comprises estimating the intake air mass flowrate associated with the incomplete combustion in the plurality of cylinders.

5. The method of claim 2, further comprising:

detecting a fuel cutoff event; and wherein estimating the intake air mass flowrate further comprises estimating the intake air mass flowrate associated with the fuel cutoff event.

6. The method of claim 1, further comprising:

commanding an engine fuel cutoff event;

monitoring engine combustion comprising individual cylinder combustion states associated with the engine fuel cutoff event; and estimating an intake air mass flowrate associated with the nominal intake air mass flowrate and the individual cylinder combustion states associated with the engine fuel cutoff event.

7. The method of claim 1, further comprising:

commanding an engine fuel cutoff event; and estimating an intake air mass flowrate associated with the nominal intake air mass flowrate and engine combustion associated with the engine fuel cutoff event.

8. Method for monitoring operation of a mass airflow metering device configured to monitor an intake air mass flowrate to a multi-cylinder internal combustion engine operating in a controlled auto-ignition combustion mode, comprising:

monitoring combustion states for each cylinder;

monitoring states of engine operating parameters;

calculating a nominal intake air mass flowrate corresponding to the states of the engine operating parameters;

estimating an intake air mass flowrate corresponding to the nominal intake air mass flowrate and the combustion states for each cylinder;

measuring an intake air mass flowrate with the mass airflow metering device;

comparing the estimated and measured intake air mass flowrates; and detecting a fault related to the mass airflow metering device when the measured intake mass airflow rate differs from the estimated intake mass airflow rate by an amount greater than a threshold amount.

9. The method of claim 8, wherein the detected fault comprises an in-range fault related to the mass airflow metering device.

10. Method for executing an in-range rationality check of a mass airflow metering device for an internal combustion engine, comprising:

operating the engine in a controlled auto-ignition combustion mode;

monitoring engine combustion states;

monitoring engine operating parameters;

calculating a nominal intake air mass flowrate corresponding to the monitored engine operating parameters;

estimating an intake air mass flowrate corresponding to the nominal intake air mass flowrate and the engine combustion states;

measuring intake air mass flowrate with the mass airflow metering device; and compare the estimated and measured intake air mass flowrates.

11. The method of claim 10, further comprising detecting an in-range fault related to the mass airflow metering device when the measured intake mass airflow rate differs from the estimated intake mass airflow rate by an amount greater than a threshold amount.

* * * * *